US008434274B2

(12) United States Patent
Anderson, Jr.

(10) Patent No.: US 8,434,274 B2
(45) Date of Patent: May 7, 2013

(54) RAPTOR NEST EXCLUSION DEVICE (76) Inventor: Clifford M. Anderson, Jr., Bow, WA (US)

( * ) Notice: Subject to any disclaimer, the term of this patent is extended or adjusted under 35 U.S.C. 154(b) by 0 days.

(21) Appl. No.: 13/343,629

(22) Filed: Jan. 4, 2012

(65) Prior Publication Data

US 2012/0174498 A1    Jul. 12, 2012

Related U.S. Application Data (60) Provisional application No. 61/430,490, filed on Jan. 6, 2011.

(51) Int. Cl.
*E04B 1/72* (2006.01)
*E04H 9/16* (2006.01)
*E04H 12/28* (2006.01)
*E04H 12/00* (2006.01)
*A01M 31/00* (2006.01)

(52) U.S. Cl.
USPC .......... 52/101; 52/244; 52/300; 43/1; 119/903

(58) Field of Classification Search ............... 52/101, 52/146, 149, 244, 300; 43/1; 119/903, 712
See application file for complete search history.

(56) References Cited

U.S. PATENT DOCUMENTS

| 1,906,016 | A | * | 4/1933 | Stecher ............... 119/61.3 |
| 2,923,382 | A | * | 2/1960 | Heldstab .................. 52/148 |
| 4,143,437 | A | | 3/1979 | Voykin |
| 4,269,008 | A | | 5/1981 | Assouline |
| 4,962,619 | A | | 10/1990 | Chatten |
| 5,181,338 | A | | 1/1993 | Chatten |
| 5,341,759 | A | | 8/1994 | Hood |
| 5,400,552 | A | | 3/1995 | Negre |
| D357,771 | S | | 4/1995 | Townsend, III |
| 5,433,029 | A | | 7/1995 | Donoho |
| 5,476,062 | A | * | 12/1995 | Ondris et al. ............. 114/343 |
| 5,606,830 | A | | 3/1997 | Townsend, Jr. |
| 5,713,160 | A | | 2/1998 | Heron |
| 6,003,471 | A | * | 12/1999 | Ohba ......................... 119/713 |
| 6,082,285 | A | | 7/2000 | Hinrichs |
| 6,418,674 | B1 | | 7/2002 | Deraedt |
| 6,477,977 | B1 | | 11/2002 | Combes |
| 6,640,506 | B2 | * | 11/2003 | Landers .................... 52/101 |
| 6,718,701 | B2 | | 4/2004 | Riddell |
| 6,775,950 | B2 | | 8/2004 | Donoho |
| 6,836,992 | B2 | | 1/2005 | Rains |
| 6,863,012 | B2 | | 3/2005 | Levin |
| 6,918,214 | B2 | * | 7/2005 | Sabine ....................... 52/101 |
| 7,036,278 | B1 | | 5/2006 | Donoho |
| 7,040,058 | B2 | | 5/2006 | Finkelstein |
| 7,154,035 | B2 | | 12/2006 | Pringle |

(Continued)

*Primary Examiner* — Ryan Kwiecinski
(74) *Attorney, Agent, or Firm* — Christensen O'Connor Johnson Kindness PLLC (57) ABSTRACT

A nest exclusion device is releasably attachable to a tower such as a cell tower, such that when installed it deters Osprey and other raptors from nesting on the tower structure, but is easily disengaged to permit worker access to the tower antenna mount structure, and can be easily reassembled. The device includes a center pole that extends upwardly away from the tower. A cap is attached to a top of the center pole, and a plurality of brackets are spaced about a periphery of the antenna mount structure with a maximum spacing between adjacent brackets of 18 inches. A plurality of cable assemblies extend from the cap to the brackets to define a tapering structure, converting the snag-shaped tower to a more conical shape.

15 Claims, 7 Drawing Sheets

U.S. PATENT DOCUMENTS

| | | |
|---|---|---|
| 7,243,465 B2 | 7/2007 | Donoho |
| 7,500,451 B2 | 3/2009 | Ingraham |
| 7,575,225 B1 | 8/2009 | Saldana |
| 7,581,359 B2 | 9/2009 | Bukeavich |
| 7,596,910 B1 | 10/2009 | Donoho |
| 7,802,405 B1 | 9/2010 | Donoho |
| 8,104,235 B2 * | 1/2012 | McCulloch et al. ............ 52/101 |
| 2004/0200439 A1 * | 10/2004 | Thomas et al. ............... 119/903 |
| 2005/0210769 A1 | 9/2005 | Harvey |
| 2006/0283370 A1 * | 12/2006 | Kurtzweil .................... 114/364 |
| 2009/0188437 A1 * | 7/2009 | Davis ............................ 119/537 |
| 2009/0249710 A1 | 10/2009 | Donoho |
| 2010/0251633 A1 * | 10/2010 | Sabine et al. .................. 52/101 |
| 2011/0168489 A1 * | 7/2011 | Grome .............................. 182/9 |
| 2012/0124918 A1 * | 5/2012 | Zimmerman ................... 52/101 |

* cited by examiner

RAPTOR NEST EXCLUSION DEVICE

CROSS-REFERENCE TO RELATED APPLICATION

This application claims the benefit of U.S. Provisional Application No. 61/430,490, filed Jan. 6, 2011, the disclosure of which is hereby expressly incorporated by reference.

BACKGROUND

With the invention and broad adoption of cellular telephone technology over the last two decades, thousands of artificial metal cellular transmission towers have been constructed and placed across the North American continent and indeed, throughout the world. These structures may be owned and operated by the major telephone carriers, tower companies and/or smaller private tower owners. A typical cell tower is designed to support multiple cellular antennas and transmission equipment in an elevated position above the surrounding terrain. A cell tower typically includes an upright support, for example a monopole, and a horizontal antenna mounting structure known in the industry as a "crow's nest." This structure is located at or near the top of the upright support and typically provides a working platform for tower personnel. There is often a railing system placed around the crow's nest for both worker safety and for attaching additional equipment, such as additional antennas and the like. The crow's nest frequently includes a floor or platform portion to facilitate inspection, maintenance, and upgrade of the installed equipment. The platform portion may include a handrail assembly for worker safety. The height of cell towers varies greatly, but typically they extend well above the top of existing structures in a given area.

Examples of cell tower and crow's nest structures can be found, for example, in U.S. Pat. No. 5,954,305, to Calabro, U.S. Pat. No. 5,649,402, to Moore, and U.S. Pat. No. 6,563,475. Each of these patents is hereby incorporated by reference in its entirety.

The Osprey (Pandion haliaetus) is a majestic raptor and one of the most widely distributed birds in the world. It can be found in both temperate and tropical regions on all continents except Antarctica. In North America, the Osprey is a relatively common raptor species, breeding in at least 34 states of the USA and in most provinces in Canada. It is particularly abundant along the Pacific and Atlantic coastlines.

Migrant Ospreys generally arrive in the north during spring. They will breed during the boreal summer months and then return south to Central and South America in the fall. They feed primarily on fish and are most often found nesting near large bodies of fresh or salt water.

Ospreys select tall, isolated and broken-off tree snags, often selecting Douglas Fir, Spruce or Ponderosa Pine for nesting. They build large nests, typically composed of a heap of sticks. This material is selected and transported to the nest primarily by the adult male and then carefully situated atop the snag by the adult female. She will place a wide assortment of other materials (grasses, sea-weed, even twine) directly on the rough upper end of the snag.

Among raptor biologists, this species is known to exhibit a very strong nest philopatry, i.e., having a tenacious attachment to the same nest tree, year after year. Once a breeding pair is established at a particular nesting location, they can be quite difficult to dissuade from nesting at the same location in the future.

With the now vast profusion of manmade towers, and especially cell towers, built in North America over the last two decades, the telecommunication industry has inadvertently created a profusion of attractive nesting sites for Ospreys. For example, from the perspective of an Osprey, cell towers mimic large, isolated nesting snags. Such manmade towers therefore "encourage" Ospreys to extend their breeding range into new areas containing these towers. This includes geographic locations where they have not previously nested, including highly populated urban areas, often situated miles from water. Based on the present inventor's experience, Ospreys are rapidly adopting manmade towers as nesting sites in ever increasing numbers. As a result of the unprecedented range expansion, they are creating many new and unexpected difficulties for the cellular telephone industry. A particularly troubling aspect of this phenomenon is the probability that those young Ospreys hatched and raised on cell towers will automatically imprint on them and, upon reaching adulthood, adopt the same type of structures for raising their families. We can therefore expect more and more manmade towers to become occupied by a geometrically increasing Osprey population over time.

Under various international, federal and/or local laws, tower operators may have very limited options for responding when a raptor nests on a tower. For example, under the Federal Migratory Bird Treaty Act (MBTA), it is typically unlawful to take or disturb an active nest of a listed species (including Osprey) during the breeding season. This law is enforced by both State and Federal Wildlife authorities. Violators of the MBTA may be fined or even imprisoned for deliberate infractions of this law. As a result of this legislation, tower maintenance crews are legally prohibited from disturbing an active Osprey nest during the entirety of its breeding season, a period which may extend from February through September, an interval of seven months. Tower workers can be legally prevented from maintaining, repairing, or otherwise resolving any operational problems that may occur during this extended time period.

In addition, many raptors can cause both disruption and damage to operating towers. Ospreys are large birds weighing up to 4 pounds and having a wingspan of over 4 feet. During the breeding season, they carry literally hundreds of large sticks and other materials to the tops of towers.

During the nest construction process, Ospreys often drop foreign objects from a tower nesting site. This material may potentially strike workers below, or damage sensitive equipment located on or around the tower (e.g., transformers). Damage may be caused by direct impact, or direct electrical shorting of lines and/or insulators, or the like. Equipment at the top of the tower may also be damaged from impact or electrical shorting. There are many records of fires being started at Ospreys nests on electrical transmission towers caused by such shorts.

In terms of hygiene, Osprey nests are inherently "messy" places. Over the course of a normal breeding season, a family of Ospreys (two adults and up to four young) create hygiene problems and other hazards for tower workers. For example, an Osprey nest may typically include an extensive amount of bird feces on, in, around, and below the nest. There will be whole and partially eaten prey items, including dead fish, and other prey. We have also found many dangerously sharp objects littering active nests, including barbed wire, dried fish bones, and rusted nails.

Additional hazards to workers include the restriction of free and open access to the worksite atop the tower. Working at height is considered dangerous enough, but when physical movements are also limited and impeded by the presence of a large, often unstable mass of precariously balanced sticks, there is increased danger to the tower workers, both on and below the nest. Since Ospreys are known to add sticks to the nest each year, this danger will increase each summer as the nest increases in size, often substantially. The larger the nest becomes, the greater amount of mass is applied to a structure that may not have been designed to accommodate the additional weight, and associated stresses. This becomes particularly relevant in areas of North America that experience hurricanes.

In addition to their own equipment, cell tower owners often rent space on their structures to several different clients, generating income from their investment. Interruption of services caused by nesting Ospreys, particularly on an annual basis, may cause the tenant to move to a different, more reliable tower site, causing a significant loss of revenue to the tower owner.

More recently, bird strikes have become a major issue in aviation safety. For example, a well-publicized bird strike incident on 15 Jan. 2009, involving US Airways flight 1549 forced Captain Sullenberger to ditch an Airbus A320 aircraft in the Hudson River with 155 crew and passengers on board. The Federal Aviation Administration (FAA Advisory Circular 150/33B) has determined that Ospreys are a species of major concern for bird strikes. As such, Ospreys breeding near major airports present an especially dangerous hazard to aviation safety. For example, in June 2010, at Seattle-Tacoma International Airport in Washington State, an adult Osprey was struck by a jet aircraft on the runway. That strike was the major impetus for the creation of the invention disclosed herein.

As a career raptor biologist, the present inventor has worked with birds of prey since 1965 in a variety of capacities, including nest surveys, migration studies, wintering investigations, and raptor banding. From 2001 through 2012, he developed and coordinated the Raptor Strike Avoidance Program at Sea-Tac Airport, working in association with the Port of Seattle. During this period they have captured, tagged, and safely re-located nearly 400 birds of prey to locations away from the runway.

In 2004, a pair of Ospreys first moved into the vicinity of the airport. They adopted an inactive cell tower located southeast of the main runways. This was the first known Osprey nesting attempt in the vicinity of the airport. Although the birds attempted to construct a nest, they were not successful. In 2005, the pair returned to the same tower, completed a nest, and raised two young. Since Osprey, particularly recently fledged young, are known to be a major threat to aviation safety, a plan was implemented to remove the young Osprey from this nest at three weeks of age and re-locate them to a more suitable active nest, 40 miles north in Snohomish County, Washington, and well away from any active airport. This technique is known as "fostering" and was successful, the young being raised by their "foster" parents. However, the following year, the same adult Ospreys returned to the nest and bred. In 2009, a second pair of Ospreys adopted a cell tower located near the airport and began constructing another nest, although they were not successful in producing young. This event raised safety concerns among our group. We began to realize that nesting Ospreys were going to be an increasing problem in our area and that cell towers were obviously going to be their "road of ingress." More Ospreys equated to increased aviation hazards. In 2010, this second pair returned and started to build and repair their nest once again. However, in June an adult Osprey (presumed to be one of these new adults) was struck by an aircraft on a runway not far from the nest. The bird was found alive but had lost a wing as a result of the strike.

This specific incident confirmed our fears and focused the present inventor's attention on the safety issues involving Ospreys nesting in the vicinity of major airports. The present inventor recognized that the solution to the problem would be to provide an effective deterrent to Ospreys nesting on local cell towers. If we could prevent them from nesting nearby, then there would be far lower risk of aircraft strikes. The challenge was to provide an effective deterrent to Osprey nesting on cell towers that would not significantly interfere with the normal maintenance and operation of the cell tower. It is essential for tower workers to have a relatively unimpeded work area in the potentially dangerous and hazardous situation like a cell tower platform high above the ground.

Because of these important emerging issues, the need for deterring Ospreys from adopting a cell tower prior to nesting becomes readily apparent. There is a need for a practical working device that will deter Osprey from building nests on cellular and other manmade towers.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A raptor nest exclusion device for tower structures includes a center pole with a cable retention cap that is configured to be installed at the top of the tower. A plurality of brackets are installed about the perimeter of the existing horizontally disposed structure at the top of the tower. Cable assemblies extend from the cap to the brackets, to define a tapering configuration that is intended to generally correspond with a healthy, complete tree top. The brackets are preferably installed with a maximum spacing between adjacent brackets of not more than 18 inches. The cable assemblies include a cable portion, a spring member, and a quick release that is configured to engage the bracket, such that the cable assemblies are easily release to allow worker access to the tower, and are easily replaced by the workers upon completion of their tasks. Preferably, the tapering configuration defined by the cable assemblies when installed, define an included angle of not more than 90 degrees.

In an embodiment, the cable assemblies include a length-adjusting device, for example, a turnbuckle. The spring members maintain the cable assemblies in tension when installed, which tension may be adjusted with the turnbuckle.

In an embodiment, the towers are cell towers, and the nest exclusion device is directed to deterring Osprey from nesting on the cell tower antenna mount structure.

In an embodiment, the cap slidably fits over the top of the center pole, and includes a plate portion with a plurality of angled apertures that are disposed to slidably receive the cable assemblies. In an embodiment, the cable assemblies include an oversized stop on the distal end that directly engages the cap.

In an embodiment, the nest exclusion device transforms an upper end of the tower from a generally horizontal, snag-like structure, to a tapered, treetop-like structure.

In an embodiment, one or more of the cable assemblies are Y-shaped such that one end engages the cap, and the other two ends engage different bracket assemblies.

In an embodiment, the bracket assemblies comprise a C-clamp configured to be attached to a periphery of the antenna mount structure, and having an eyelet bolt extending therefrom.

In an embodiment, the invention includes a method for deterring Osprey from constructing a nest on a cell tower having an antenna mount structure, and includes installing a center pole with a cap on the cell tower, installing brackets onto a periphery of the antenna mount structure, and installing a plurality of cable assemblies that extend from the cap to the brackets, wherein the cable assemblies include a cable portion, a spring, and a quick release mechanism for releasably engaging the brackets.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The key objectives for a workable nest exclusion device for working towers, such as cell towers, are: (i) To dissuade Osprey pairs from building a nest on the antenna mount (crow's nest) of the tower; (ii) To provide a device that is removable both quickly and easily to allow access and limit interference to tower workers at the antenna mount; and (iii) To provide a device that is easily and quickly replaced upon the completion of maintenance or other tasks on the tower.

Unlike many other raptor species, Ospreys typically select a high, open, broken-off tree-top (snag) for building a nest. Such sites allow adult birds free and open access to the nest from all directions, which allows the large raptors to take advantage of the prevailing wind direction when approaching the nest. This allows the Osprey to easily deliver sticks to the nest and food to the young in an unencumbered manner.

The horizontal superstructure (i.e., antenna mount) of many cell towers mimic the natural conditions favored by Ospreys for nesting. An exclusion device should radically change or alter the configuration of the cell tower from a substantially horizontal platform (that Osprey may equate to a broken-off tree snag) to a tapered or generally conical top (that the Osprey may equate to an unbroken tree top) so that the Ospreys will find the tower less desirable for nesting, and breed elsewhere.

Figure 1:
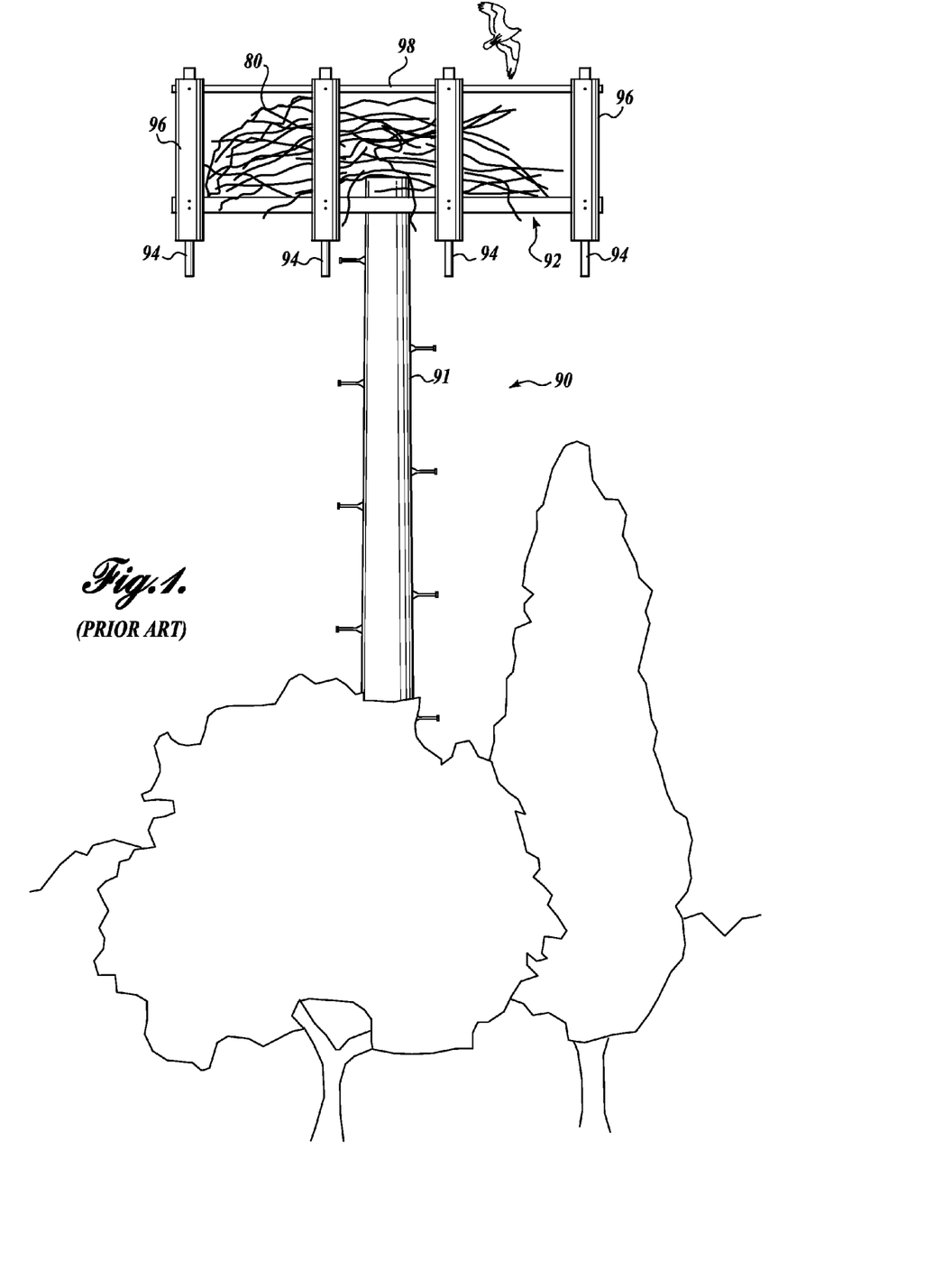
FIG. 1 illustrates a conventional cell tower with an Osprey nest on the antenna mount.

FIG. 1 shows a conventional cell tower 90 with an Osprey nest 80 shown on the antenna mount 92. The cell tower comprises a tall upright support 91 having a platform or antenna mount 92 installed at an upper end of the upright support 91. The antenna mount 92 typically includes a plurality of elongate peripherally located antenna pipes or posts 94 oriented vertically, to which the cell tower antenna 96 are mounted. The specific shape and configuration of cell towers varies considerably, and may include railing, floor structure, and the like. Osprey may find the antenna mount 92 ideal for building a nest 80. The Osprey nest 80 typically comprises a large heap of sticks, tree limbs, driftwood and/or seaweed. Stick lengths of 18 inches and longer are common in an Osprey nest.

Figure 2:
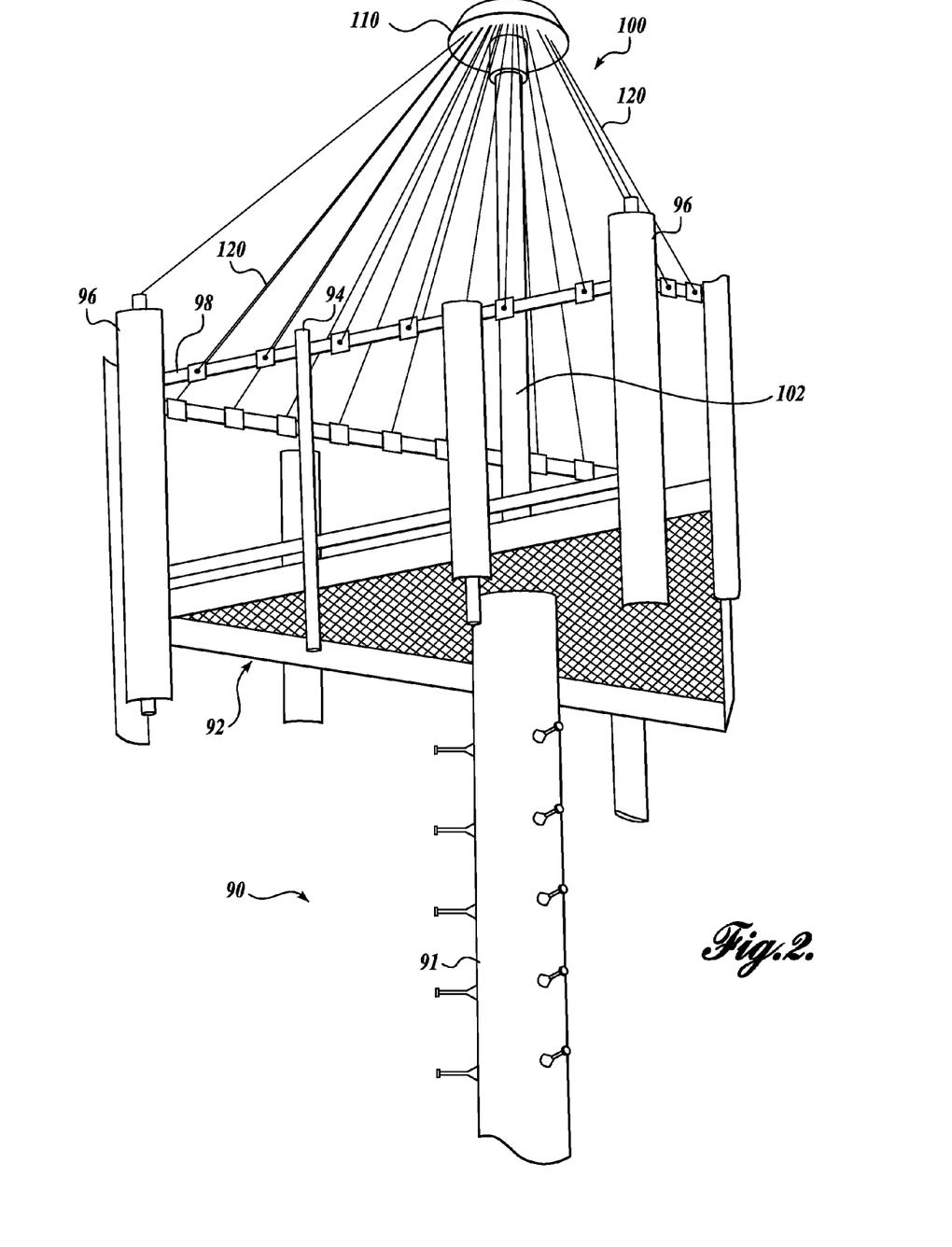
FIG. 2 shows an upper portion of a cell tower with a nest exclusion device in accordance with the present invention removably installed on the crow's nest or antenna mount.
Figure 3:
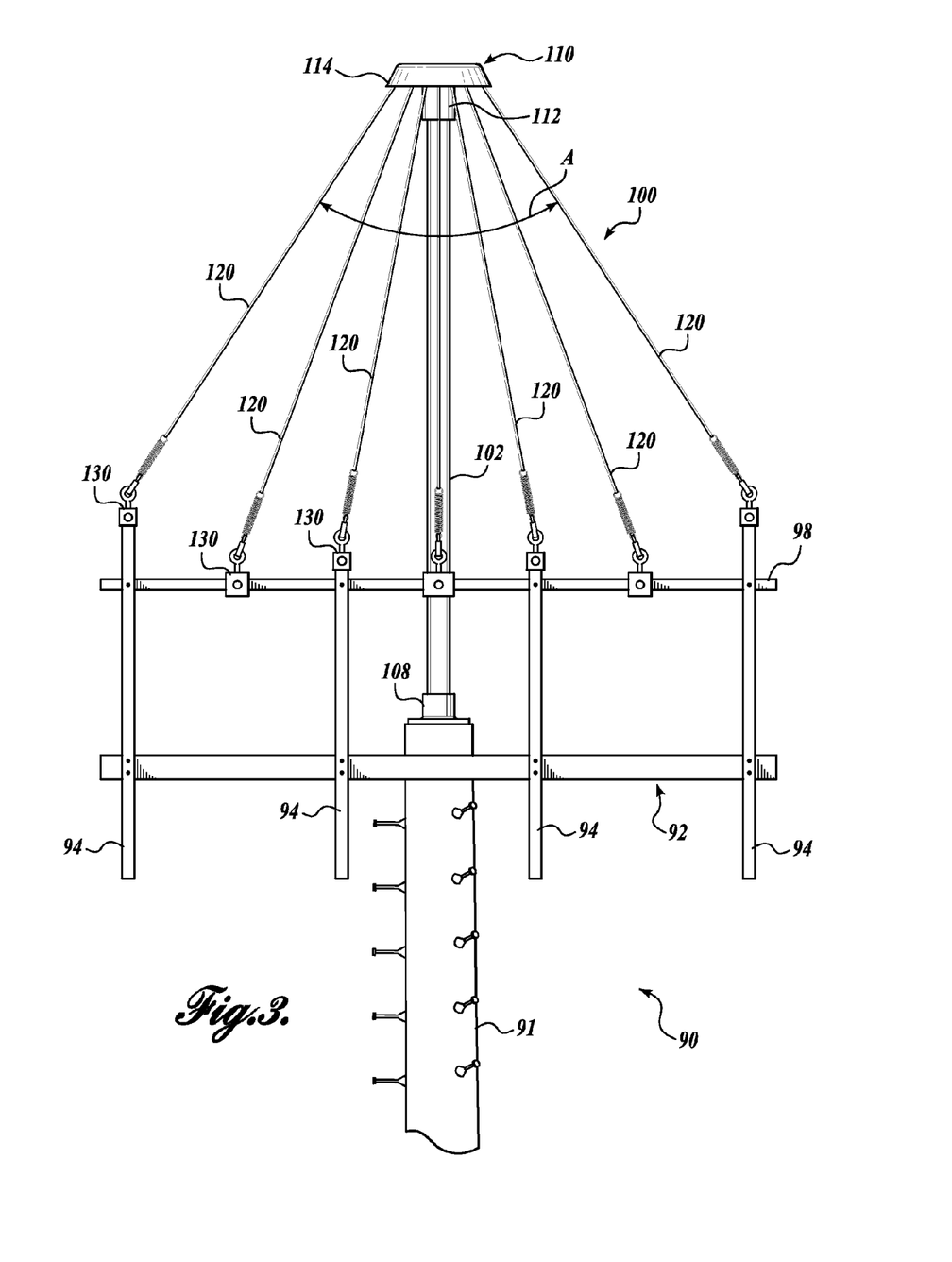
FIG. 3 is a front view of the nest exclusion device shown in FIG. 2 installed on an antenna mount.

A nest exclusion device 100 in accordance with the present invention is shown in FIG. 2 attached to a cell tower 90. FIG. 3 shows a front view of the exclusion device 100 schematically with the antenna 96 and rearward cables and related structure omitted, for clarity.

A main center pole or mast 102, which may be formed from metal, fiberglass, composite or other suitable pole material, is installed typically directly over the tower upright support 91. The center pole 102 may be attached directly to the upright support 91, or may be attached to other support structure over the upright support 91. For example, in a current embodiment a socket plate 108 sized to receive the bottom end of the center pole 102 is fixed to a top end of the upright support 91. Preferably, the center pole 102 is length-adjustable such that the center pole 102 can be shortened or extended to accommodate different tower designs and dimensions. In a current embodiment, the center pole 102 is a telescoping pole with multiple aligned holes in both parts that permit the user to adjust the length of the center pole 102 by aligning the desired holes and inserting a pin, bolt or the like to achieve the desired length. Alternatively, the center pole 102 may be selected with the desired length for a particular cell tower application.

The desired length of the center pole 102 will vary depending on the design of the particular cell tower. For example, a typical center pole 102 length may range from 3 to 10 feet. It is believed to be beneficial to select a center pole 102 length such that the largest angle defined by any two cable assemblies 120 (angle "A" in FIG. 3, hereinafter referred to as the included angle) is not more than 90 degrees, and in some embodiments not less than 60 degrees. The nest exclusion device 100 therefore transforms the shape of the upper end of the cell tower 90 from a relatively flat shape similar to a snag to a more conical shape similar to an unbroken tree top.

In this embodiment, a cable-retention cap 110 is attached to the top end of the center pole 102. The cap 110 has a tubular lower portion 112 that is sized to slide over the top end of the center pole 102, and an attachment plate portion 114 engages a plurality of cable assemblies 120.

The plurality of exclusion cable assemblies 120 in the current embodiment comprise stainless steel wire cable having a minimum diameter of 3/32-inch to 1/8-inch. The thickness of the exclusion cable 120 is selected to provide sufficient strength to withstand the weight of large raptorial birds landing on the device 100. The cable assemblies 120 extend from one side of the antenna mount 92 to the cap 110. The cable assemblies 120 may attach to the hand rail 98, to a peripheral post 94, or to the antenna mount 92 platform. For example, in the embodiment shown in FIG. 3, some or all of the peripheral posts 94 have an eyelet bracket assembly 130 attached to an upper end. Additionally, eyelet bracket assemblies 130 are attached to the hand rail 98 at intermediate locations. Preferably, the maximum spacing between any two neighboring eyelet bracket assemblies 130 is less than or equal to about 18 inches.

The maximum 18-inch spacing is selected to discourage Osprey from attempting to carry the relatively large sticks that are used to build a nest onto the antenna mount 92. Providing a greater number of cable assemblies 120 to provide a smaller maximum spacing between bracket assemblies 130 will provide greater deterrence with the tradeoff of increasing the time and effort required for workers to remove and replace the cable assemblies 120 during maintenance.

In a preferred embodiment, the center pole 102 and exclusion cable assemblies 120 of the exclusion device 100 are configured to define a generally tapered or conical shape that mimics the top of a coniferous tree and defines an included angle, for example, in the range of 60 to 90 degrees.

Figure 4:
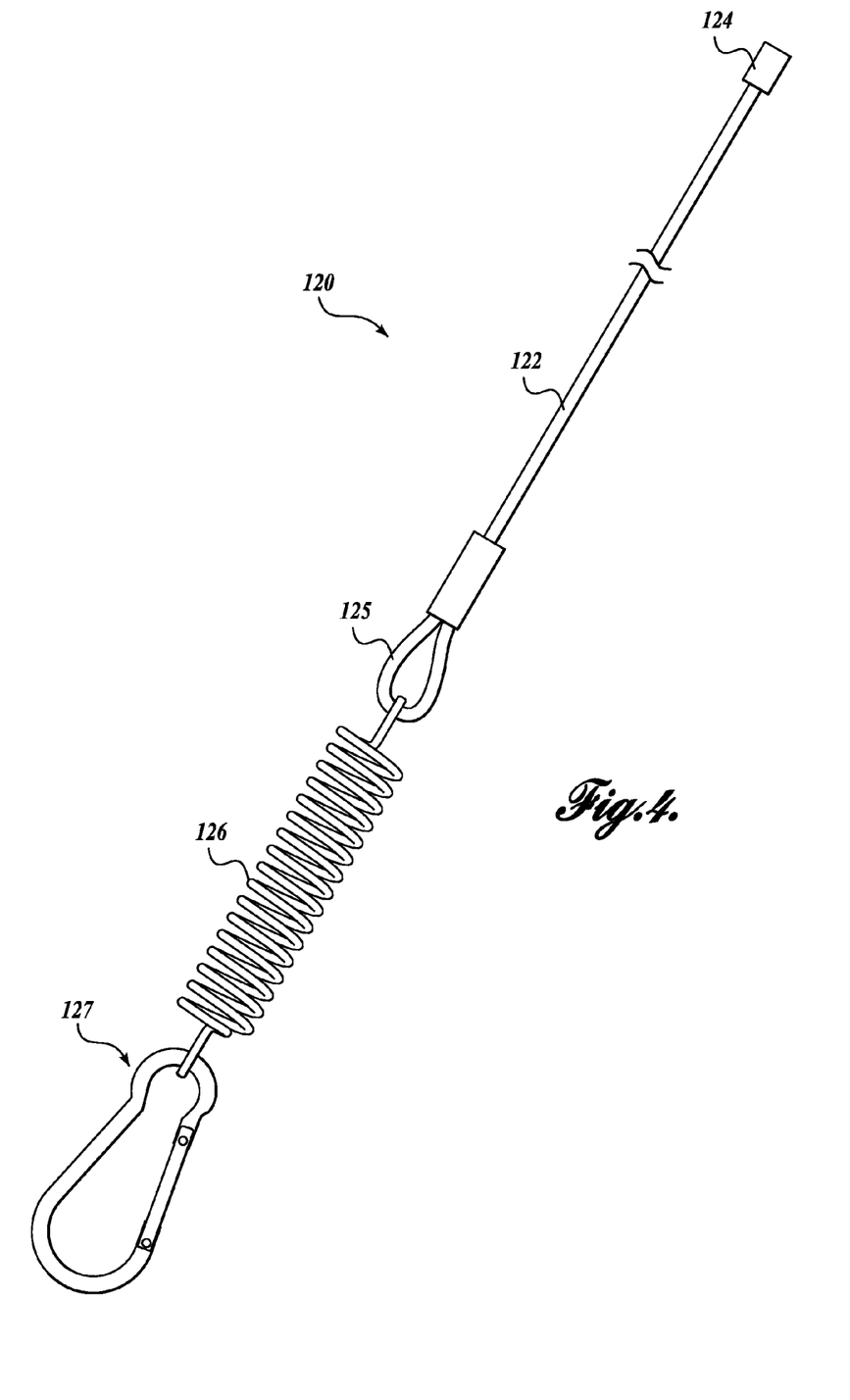
FIG. 4 illustrates an exemplary cable assembly for the nest exclusion device shown in FIG. 2.

An exemplary cable assembly 120 is shown in FIG. 4. The cable assembly 120 includes a cable portion 122 with a distal end having a larger diameter stop 124 attached thereto. A proximal end of the cable portion 122 forms a loop 125. A spring 126 engages the loop 125, and terminates with a hook element, for example a stainless steel carabiner-type ring or snap link 127. The engagement ring 127 attaches to the cable portion 122 through the spring 126 to provide a desired tension in the cable assembly 120 and facilitate installation and removal of the cable assemblies 120. Although not illustrated, it is contemplated, and may be preferred in many applications that the cable assembly 120 include a length-adjustment member such as a turnbuckle or the like. For example, a turnbuckle may be inserted between the cable portion 122 and the spring 126. A turnbuckle provides means to adjust the tension in the cable assembly 120 for attachment to the hand rail 98. It also provides an easier method to install and adjust the correct length of the cable assembly 120 while working on the high elevation superstructure of the tower 90.

Figure 5:
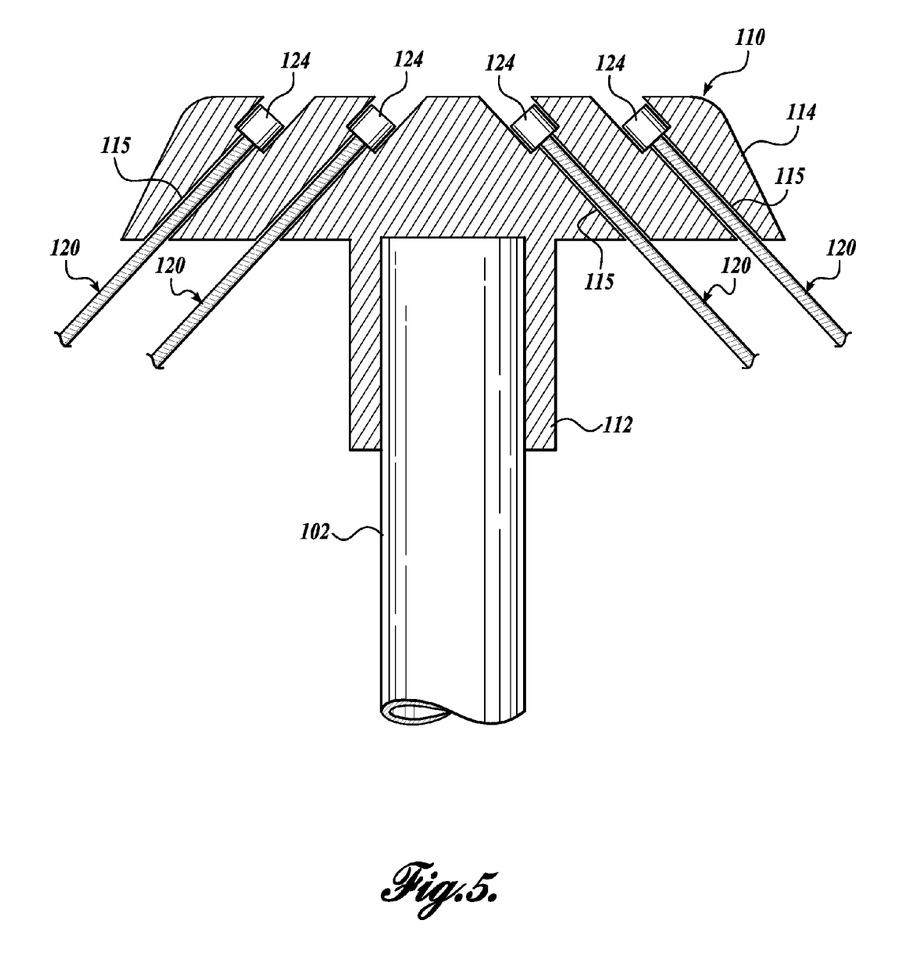
FIG. 5 is a cross-section detail view showing the cable retention cap for the nest exclusion device shown in FIG. 2.

FIG. 5 is a cross-sectional detail view of the top end of the exclusion device 100, showing the cable-retention cap 110 disposed on the center pole 102 and engaging several cable assemblies 120. The cap 110 includes a plurality of angled through holes 115 that are sized and positioned to receive the cable assemblies 120, and to engage the cable assembly stops 124 to retain the cable assembly 120. The stops may be attached to the corresponding cable portion 122 after the cable portion 122 is inserted through the hole 115, or the hole 115 may be provided with an oversized portion (not shown) that allows the stop to be threaded through the cap 110, and then shifted to engage the cap 110 as illustrated in FIG. 5.

Figure 6:
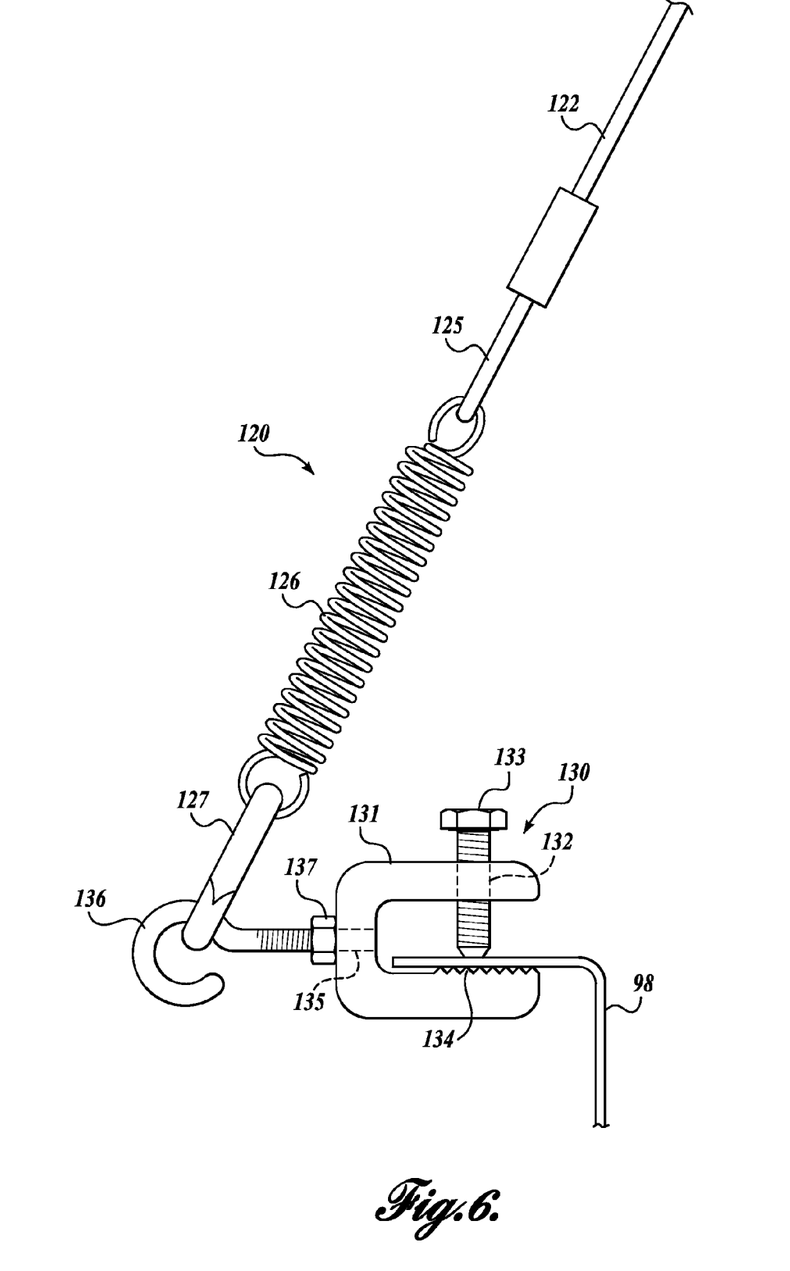
FIG. 6 is a detail view illustrating an exemplary eyelet bracket assembly for the nest exclusion device shown in FIG. 2.

A detailed view of an exemplary eyelet bracket assembly 130 is shown in FIG. 6 attached to the hand rail 98 and to the cable assembly 120. In this embodiment, the eyelet bracket assembly includes a C-clamp 131 having a first threaded aperture 132 on one arm that threadably engages an attachment bolt 133. An opposite arm of the C-clamp 131 may be provided with gripping elements such as teeth 134. The C-clamp 131 may therefore be positioned over a flange on the hand rail 98 and fixed thereto by tightening the attachment bolt 133. The C-clamp 131 has a second threaded aperture 135 at its base that is threadably engaged with a hook member 136. A locking nut 137 is provided to further secure the hook member 136 to the C-clamp 131. The hook member 136 is sized to engage the snap link 127 of a cable assembly 120.

Of course, if the cell tower does not include hand rails, the bracket assemblies 130 may be attached directly to the antenna mount structure 92. If cable assemblies are to be attached also to one or more of the peripheral posts 94, eyelet bracket assemblies 130 sized and/or modified to attach to the posts 94 may be attached thereto.

Installation of the exclusion device 100 will now be described with reference to FIGS. 3-6. When the exclusion device is initially installed, the socket plate 108 is installed directly to, or over, the cell tower upright support 91. The center pole 102 is then inserted into the socket plate 108, and may optionally be secured therein, for example, with a locking bolt or the like (not shown). If the center pole 102 is length-adjustable, the desired height for the particular application is set. As discussed above, the center pole 102 length is preferably set such that the cable assemblies 120 are disposed within an included angle of between 60 and 90 degrees. The bracket assemblies 130 are then fixed to the hand rails 98, peripheral posts 94, and/or antenna mount 92 at the desired spacing. As discussed above, preferably, th bracket assemblies 130 have a maximum spacing of about 18 inches or less.

If the cable assemblies 120 are not already threaded through the apertures in the cable-retention cap 110, they may now be assembled. The cap 110 is positioned over the top of the center pole 102, and if desired locked into position. It is now a very easy and quick process to attach each of the cable assemblies 120 to a corresponding one of the bracket assemblies 130 by pulling the proximal end of the cable assembly 120 against the tension force of the spring 126 and engaging the snap link 127 to the associated hook member 136.

The top of the cell tower 90 will then present a generally conical shape to Osprey, which will not be perceived as a suitable nesting site. Moreover, if the bracket assemblies 130 are spaced not more than 18 inches apart, the cable assemblies 120 will make it difficult for an Osprey to transport similar-length sticks onto the antenna mount 92.

It will also be appreciated that when workers require access to the antenna mount 92, e.g., for maintenance or upgrade, they can quickly and easily disconnect the cable assemblies 120 from the bracket assemblies 130. The cable assemblies 120 may be readily stowed near the center pole 102 while maintenance is performed, and then the cable assemblies 120 may be reattached to corresponding bracket assemblies 130.

Figure 7:
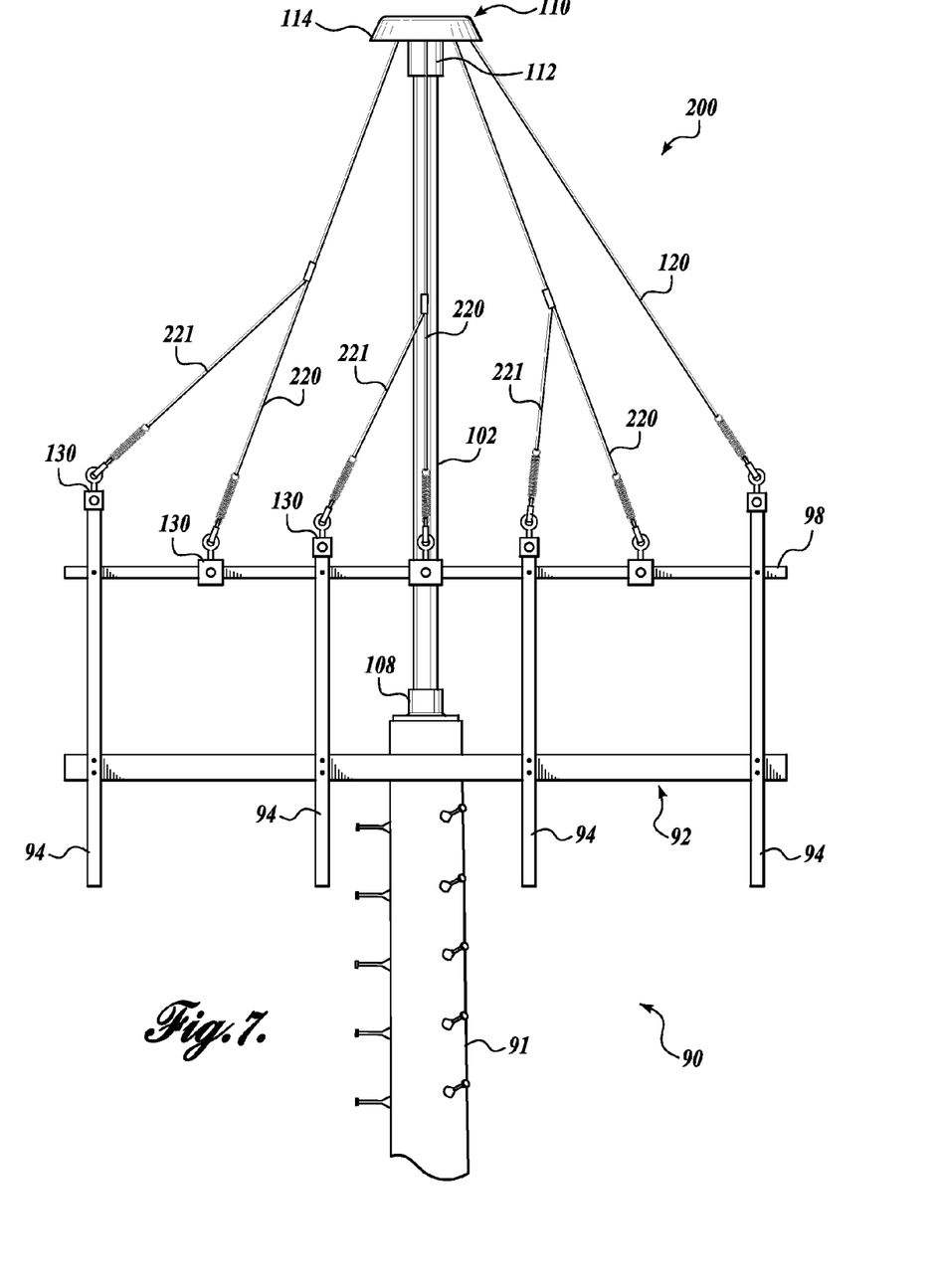
FIG. 7 is a front view of another embodiment of a nest exclusion device in accordance with the present invention removably installed on an antenna mount.

A front view of another embodiment of a nest exclusion device 200 in accordance with the present invention is shown in FIG. 7. This embodiment is similar in many specifics to the exclusion device 100 described above, and common aspects of the device will not be repeated. In this embodiment, some or all of the cable assemblies 220 are generally Y-shaped, wherein a first portion of the cable assembly 220 extends from the cap 110 to a bracket assembly 130. A second portion of the cable assembly 221 branches away from an intermediate location, to engage an adjacent bracket assembly 130. The second portion 221 may be formed integrally with the first portion, or may be spliced onto the first cable portion. Both cable portions 220, 221 include the spring 126 and snap link 127 shown FIG. 4. It is contemplated that more than one branching cable portion may be provided. The branching cable assembly 220 reduces the total material required for the nest exclusion device 200, while still retaining the desired maximum cable spacing throughout the device 200.

In other alternative embodiments, the cap 110 on top of the center pole 102 may comprise a simple hoop (as disclosed in the provisional patent application incorporated by reference above) and the cable assemblies 120 may slidably extend through the hoop to engage an opposite side of the antenna mount structure 92. Of course, branching cable assemblies may also be used with the hoop-type cap.

While illustrative embodiments have been illustrated and described, it will be appreciated that various changes can be made therein without departing from the spirit and scope of the invention.

The embodiments of the invention in which an exclusive property or privilege is claimed are defined as follows:

1. A nest exclusion device for a tower having an upright support and an antenna mount structure, the nest exclusion device comprising:
    a center pole having a proximal end configured to be attached to the tower and a distal end extending away from the tower;
    a cap disposed on the distal end of the center pole;

a plurality of bracket assemblies configured to be fixed to a periphery of the antenna mount structure;

a plurality of cable assemblies, having a distal end that directly engages the cap, extend between the plurality of bracket assemblies and the cap such that the plurality of cable assemblies are adapted to define a tapering profile about the center pole; and wherein the plurality of cable assemblies each comprise a cable portion, a spring, and a quick release mechanism for engaging an associated one of the plurality of bracket assemblies, such that each of the plurality of cable assemblies can be easily released from the associated one of the plurality of bracket assemblies and easily reengage the associated one of the plurality of bracket assemblies; and further wherein the distal end of each of the plurality of cable assemblies comprises an enlarged stop fixed to the cable portion, and further wherein the cap comprises a plurality of angled apertures that are sized to slidably receive the cable portion of an associated one of the plurality of cable assemblies and to block the enlarged stop.

2. The nest exclusion device of claim 1, wherein the plurality of bracket assemblies are spaced apart such that the maximum spacing between adjacent bracket assemblies is not greater than 18 inches.

3. The nest exclusion device of claim 1, wherein the tapering profile defined by the cable assemblies has an included angle of not greater than 90 degrees.

4. The nest exclusion device of claim 1, wherein the quick release mechanism comprises a carabiner snap link.

5. The nest exclusion device of claim 1, wherein the nest exclusion device transforms an upper portion of the tower from a generally snag shape to a generally conical shape.

6. The nest exclusion device of claim 1, wherein at least one of the plurality of cable assemblies comprise a Y-shaped cable portion.

7. The nest exclusion device of claim 6, wherein the at least one of the plurality of cable assemblies comprising the Y-shaped cable portion comprise the distal end that engages the cap, a first proximal end that releasably engages one of the plurality of bracket assemblies, and a second proximal end that releasably engages a different one of the plurality of bracket assemblies.

8. The nest exclusion device of claim 1, wherein at least some of the plurality of bracket assemblies comprises a C-clamp that is configured to be fixed to the antenna mount structure and a hook portion that extends away from the C-clamp.

9. An Osprey nest deterrent that is configured to be releasably attached to a cell tower antenna mount structure, the Osprey nest deterrent comprising:

a center mast having a proximal end configured to be attached to the antenna mount structure and a distal end that extends upwardly from the antenna mount structure;

a cable assembly comprising a cap portion attached to the distal end of the center mast and a plurality of cable subassemblies that extend from the cap portion;

a plurality of bracket assemblies that define a periphery of the nest deterrent and wherein the plurality of bracket assemblies releasably engage the plurality of cable subassemblies;

wherein the plurality of cable subassemblies comprise a cable portion with a hook member attached to a proximal end of the cable portion with a spring, the hook member being configured to releasably engage an associated one of the plurality of bracket assemblies with a quick release link; and wherein at least one of the plurality of cable subassemblies comprise Y-shaped cable portions having a distal end that engages the cap portion, a first proximal end that releasably engages one of the plurality of bracket assemblies, and a second proximal end that releasably engages a different one of the plurality of bracket assemblies.

10. The Osprey nest deterrent of claim 9, wherein the plurality of bracket assemblies are spaced apart such that the maximum spacing between adjacent bracket assemblies is not greater than 18 inches.

11. The Osprey nest deterrent of claim 9, wherein the cable assembly defines a tapering profile having a maximum angle between any two cable subassemblies of not greater than 90 degrees.

12. The Osprey nest deterrent of claim 9, wherein the nest deterrent is configured to transform the cell tower antenna mount structure from a generally flat shape to a generally conical shape.

13. A method for deterring Osprey from constructing a nest on a cell tower having a horizontally disposed antenna mount structure, comprising:

installing a center pole having a proximal end, a distal end, and a cap onto an upper end of the cell tower such that the distal end of the center pole extends upwardly away from the cell tower;

installing a plurality of brackets onto a periphery of the antenna mount structure such that the maximum spacing between adjacent brackets is no greater than 18 inches; and installing a plurality of cable assemblies having a distal end such that the plurality of cable assemblies extend from the cap to a corresponding one of the plurality of brackets, and wherein the plurality of cable assemblies attach to the plurality of brackets with a quick release mechanism;

wherein the plurality of cable assemblies each include a cable portion, a spring, and the quick release mechanism, and further wherein the distal end of each of the plurality of cable assemblies comprises an enlarged stop fixed to the cable portion, and further wherein the cap comprises a plurality of angled apertures that are sized to slidably receive the cable portion of an associated one of the plurality of cable assemblies and to block the enlarged stop.

14. The method of claim 13, wherein the cable assemblies are Y-shaped.

15. The method of claim 13, wherein the cable assemblies convert the upper end of the cell tower from a horizontally disposed structure to a tapering structure.

* * * * *